US008106885B2

(12) United States Patent
Lowles et al.

(10) Patent No.: US 8,106,885 B2
(45) Date of Patent: Jan. 31, 2012

(54) INPUT MECHANISM FOR HANDHELD ELECTRONIC COMMUNICATION DEVICE

(75) Inventors: Robert J. Lowles, Waterloo (CA); Edward Hui, Waterloo (CA); Steven Fyke, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 681 days.

(21) Appl. No.: 11/960,230

(22) Filed: Dec. 19, 2007

(65) Prior Publication Data

US 2009/0160769 A1   Jun. 25, 2009

(51) Int. Cl.
*G06F 3/033* (2006.01)
*G09G 5/08* (2006.01)
*G09G 5/00* (2006.01)

(52) U.S. Cl. ......... 345/166; 345/156; 345/160; 345/167

(58) Field of Classification Search ........... 345/156–172
See application file for complete search history.

(56) References Cited

U.S. PATENT DOCUMENTS

| 6,057,540 | A | 5/2000 | Gordon |
| 6,326,948 | B1* | 12/2001 | Kobachi et al. ............... 345/157 |
| 6,496,181 | B1 | 12/2002 | Boemer et al. |
| 6,816,154 | B2* | 11/2004 | Wong et al. .................... 345/175 |
| 7,129,932 | B1* | 10/2006 | Klarlund et al. ............. 345/168 |
| 7,732,752 | B2* | 6/2010 | Mathis et al. .................. 250/221 |
| 2002/0093487 | A1* | 7/2002 | Rosenberg .................... 345/166 |
| 2004/0046741 | A1* | 3/2004 | Low et al. ..................... 345/166 |
| 2004/0061689 | A1* | 4/2004 | Ito ................................. 345/175 |
| 2005/0243053 | A1* | 11/2005 | Liess et al. .................... 345/156 |
| 2006/0152484 | A1* | 7/2006 | Rolus Borgward .......... 345/157 |
| 2007/0120825 | A1* | 5/2007 | Cheng ........................... 345/166 |
| 2007/0138496 | A1* | 6/2007 | Zhao et al. ..................... 257/98 |
| 2008/0284735 | A1* | 11/2008 | Shim ............................. 345/166 |

FOREIGN PATENT DOCUMENTS

| EP | 1109127 A2 | 6/2001 |
| EP | 1591880 A2 | 11/2005 |
| WO | 2006029455 A1 | 3/2006 |

OTHER PUBLICATIONS

Examination Report dated Mar. 2, 2009. In corresponding application No. 07123694.7.
Extended European Search Report dated Apr. 28, 2008. In corresponding application No. 07123694.7.
Office Action dated Jan. 28, 2011. In corresponding application No. 2,646,142.

* cited by examiner

*Primary Examiner* — Bipin Shalwala
*Assistant Examiner* — Ilana Spar
(74) *Attorney, Agent, or Firm* — Novak Druce + Quigg LLP

(57) ABSTRACT

A handheld electronic communication device features an optically based user input device and navigation tool. In one embodiment, the optically based user input device features a translucent domed lens and a light source to illuminate a user's finger as the user slides his finger over the domed lens. In another embodiment, the optically based user input device features a translucent ball that the user rotates. In both embodiments, optical means are used to measure movement of the user's finger and translate that movement into a navigational command to the handheld electronic communication device. The optically based user input device is further configured such that an entry command is entered by depressing the optically based user input device.

21 Claims, 7 Drawing Sheets

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L | | |
| Z | X | C | V | B | N | M | | | |

*FIG. 3A* (44a)

| 1 | 2 | 3 | 4 | 5 | 6 | 7 | 8 | 9 | 0 |
|---|---|---|---|---|---|---|---|---|---|
| Q | W | E | R | T | Z | U | I | O | P |
| A | S | D | F | G | H | J | K | L | |
| Y | X | C | V | B | N | M | | | |

*FIG. 3B* (44b)

| 1 | 2 | 3 | 4 | 5 | 6 | 7 | 8 | 9 | 0 |
|---|---|---|---|---|---|---|---|---|---|
| A | Z | E | R | T | Y | U | I | O | P |
| Q | S | D | F | G | H | J | K | L | |
| W | X | C | V | B | N | M | | | |

*FIG. 3C* (44c)

| 1 | 2 | 3 | 4 | 5 | 6 | 7 | 8 | 9 | 0 |
|---|---|---|---|---|---|---|---|---|---|
| | | | P | Y | F | G | C | R | L |
| A | O | E | U | I | D | H | T | N | S |
| | Q | J | K | X | B | M | W | V | Z |

*FIG. 3D* (44d)

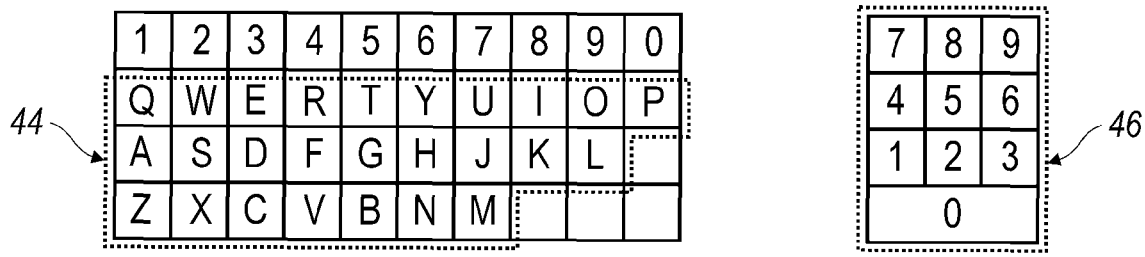
FIG. 4
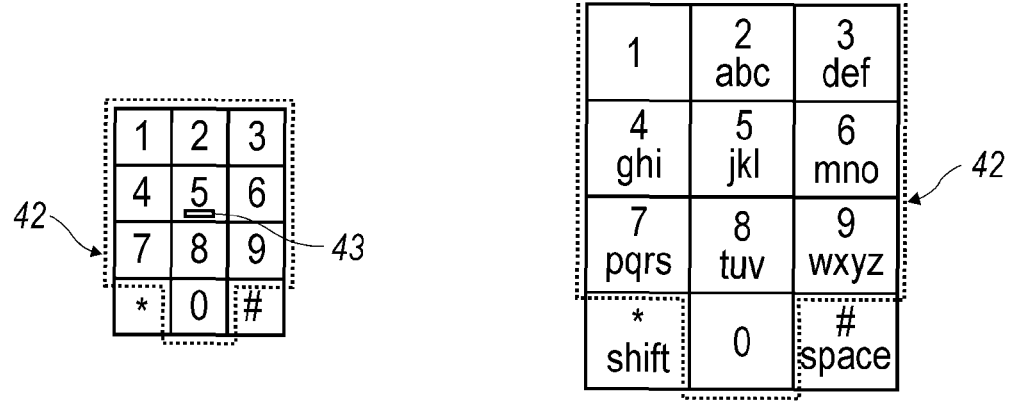
FIG. 5  FIG. 6

INPUT MECHANISM FOR HANDHELD ELECTRONIC COMMUNICATION DEVICE

FIELD

This disclosure, in a broad sense, is directed toward a handheld electronic communication device that has wireless communication capabilities and the networks within which the handheld electronic communication device operates. More particularly, the disclosure relates to a mechanism by means of which an operator interfaces with the device to "navigate" the device and to enter commands into the device.

BACKGROUND

With the proliferation of wireless communication systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld electronic communication devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize the entire keyboard surface as efficiently as possible.

Many keyboards on mobile devices have an input device for navigation through the graphical user interface. These interfaces include such devices as trackballs and rotating wheels which can be used to effect movement of a cursor or pointer, or to scroll up, down and about a displayed page. These navigation devices often occupy a disproportionately large amount of space on the incorporating mobile device. Moreover, they use mechanical means to detect motion of the input device, which mechanical means can wear out over time or can become fouled with dirt, skin oils, and other similar contaminants, which prevents them from accurately operating.

BRIEF DESCRIPTION OF THE DRAWINGS

Exemplary methods and arrangements conducted and configured according to the advantageous solutions presented herein are depicted in the accompanying drawings wherein:

FIG. 3a illustrates an exemplary QWERTY keyboard layout;

FIG. 3b illustrates an exemplary QWERTZ keyboard layout;

FIG. 3c illustrates an exemplary AZERTY keyboard layout;

FIG. 3d illustrates an exemplary Dvorak keyboard layout;

FIG. 4 illustrates a QWERTY keyboard layout paired with a traditional ten-key keyboard;

FIG. 5 illustrates ten digits comprising the numerals 0-9 arranged in a traditional, ITU Standard E.161 numeric telephone keypad layout, including the * and # keys flanking the 0 key;

FIG. 6 illustrates a traditional or standard phone key arrangement or layout according to the ITU Standard E.161 including both numerals and letters;

DETAILED DESCRIPTION

Figure 1:
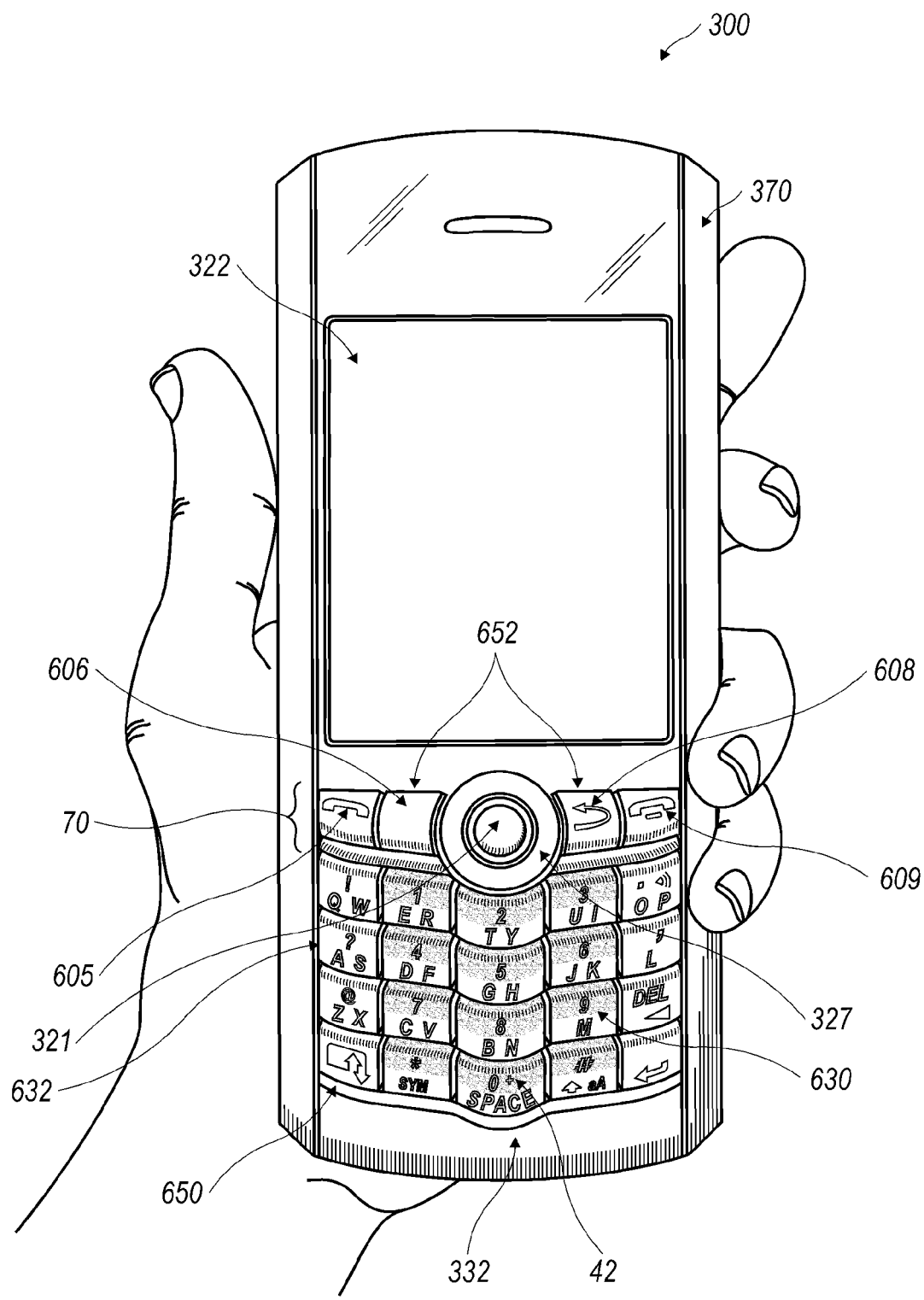
FIG. 1 illustrates an exemplary handheld communication device cradled in the palm of a user's hand, in which communication device an input mechanism according to the present teachings may be incorporated.
Figure 2:
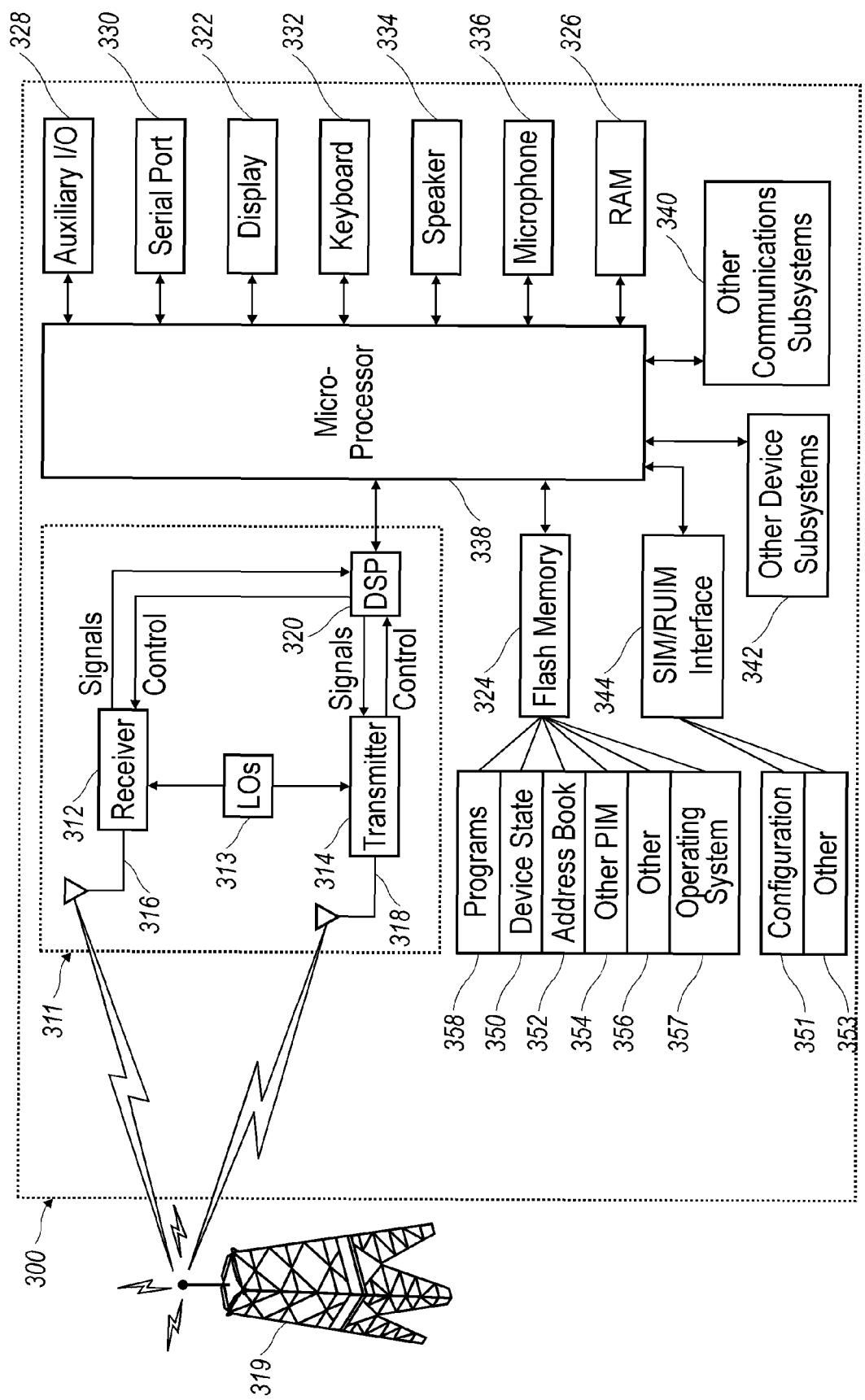
FIG. 2 is a block diagram representing a wireless handheld communication device interacting in a communication network.

An exemplary handheld electronic communication device 300 is shown in FIG. 1, and the device's cooperation in a wireless network 319 is exemplified in the block diagram of FIG. 2. These figures are exemplary only, and those persons skilled in the art will appreciate the additional elements and modifications necessary to make the handheld electronic communication device 300 work in particular network environments.

As shown in the block diagram of FIG. 2, the handheld electronic communication device 300 includes a microprocessor 338 that controls the operation of the handheld electronic communication device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display screen 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the handheld electronic communication device 300.

Figure 7:
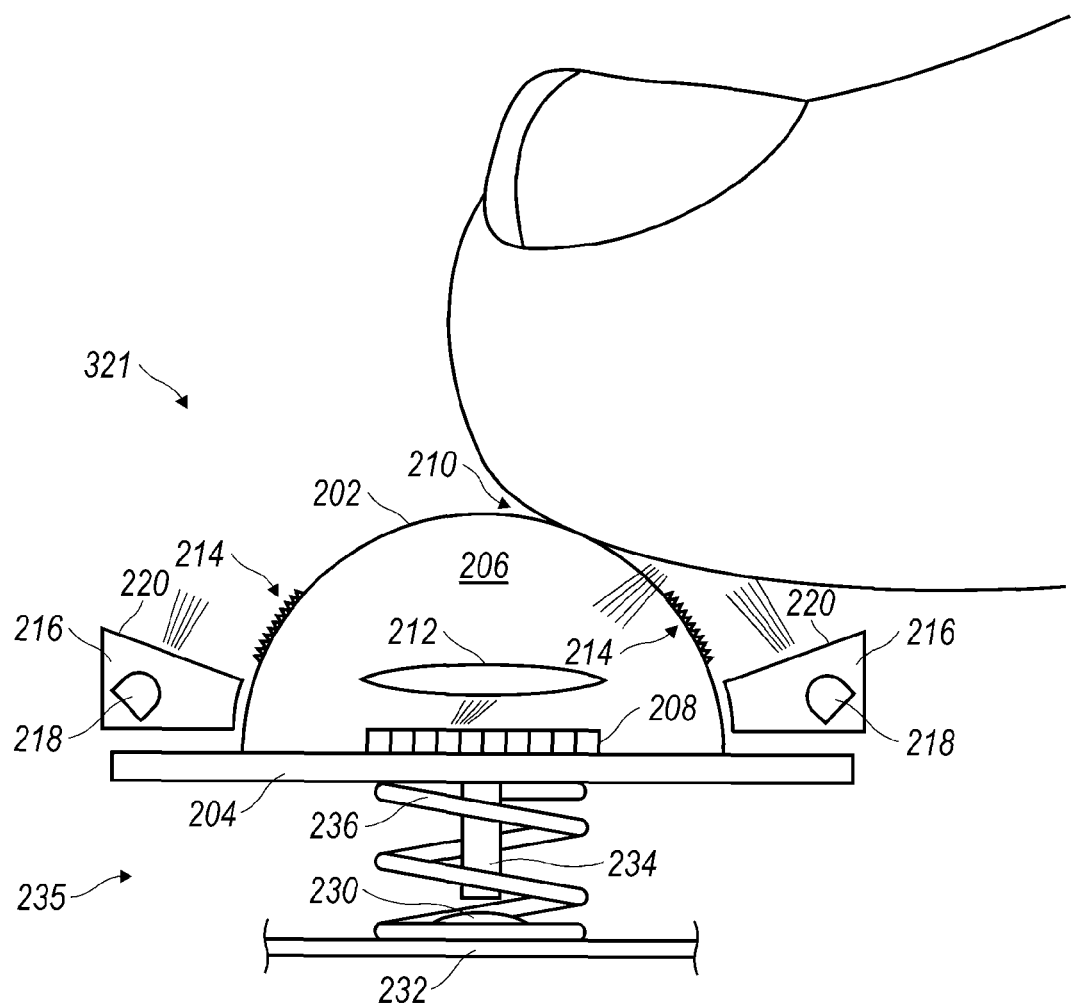
FIG. 7 illustrates a first embodiment of an optically based user input device according to this disclosure.
Figure 8:
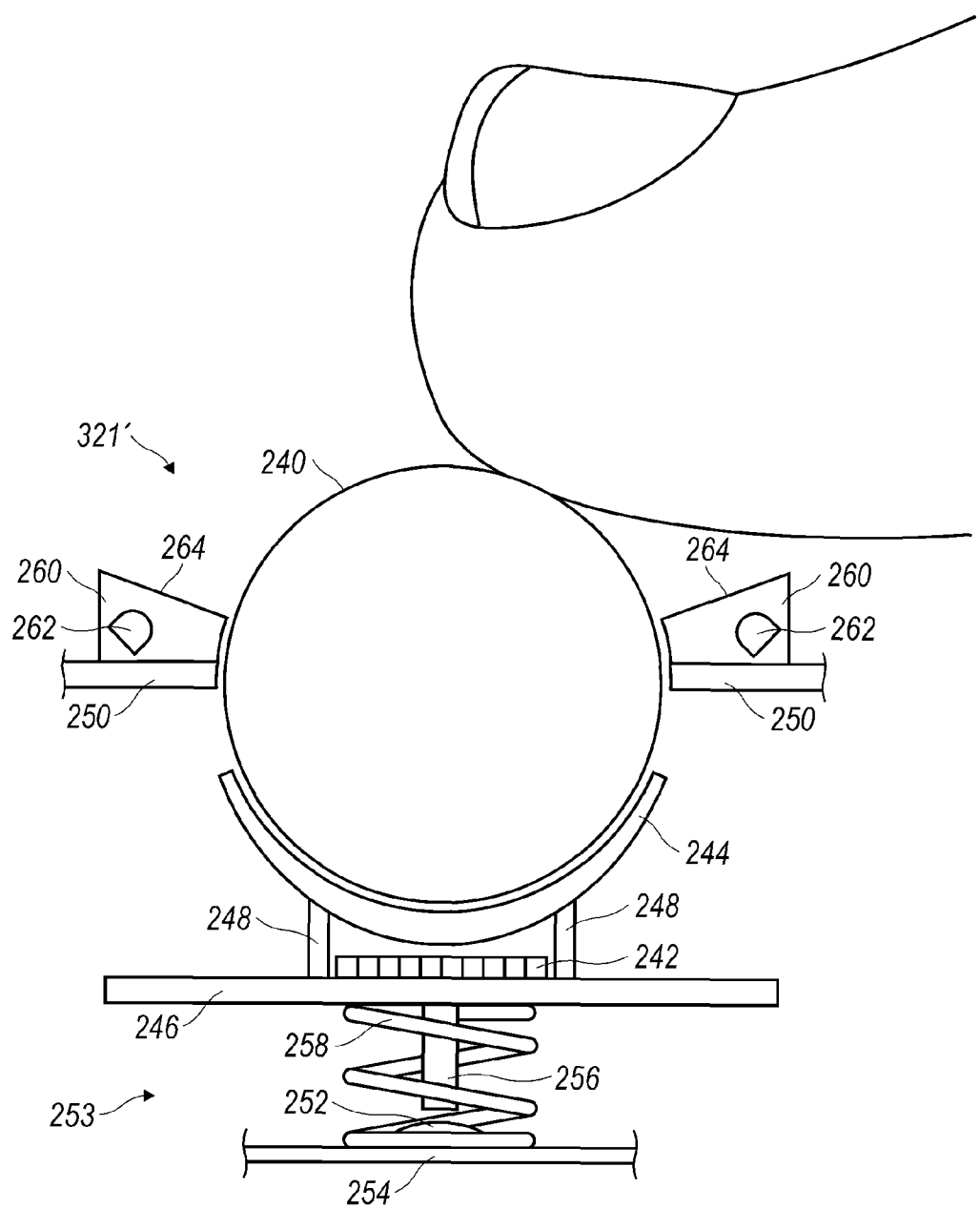
FIG. 8 illustrates a second embodiment of an optically based user input device according to this disclosure.

In general, the auxiliary I/O subsystem 328 can take the form of a variety of different navigation tools (multi-directional or single-directional) such as an optically based user input device navigation tool 327 as described in this disclosure and as illustrated in the exemplary embodiment shown in FIG. 1 and as further illustrated in FIGS. 7 and 8; a thumbwheel; a navigation pad; a joystick; or the like. These optically based user input device navigation tools 327 are preferably located on the front surface of the handheld electronic communication device 300 but may be located on any exterior surface of the handheld electronic communication device 300. Other auxiliary I/O subsystems can include external display devices and externally connected keyboards (not shown). While the above examples have been provided in relation to the auxiliary I/O subsystem 328, other subsystems capable of providing input or receiving output from the handheld electronic communication device 300 are considered within the scope of this disclosure. Additionally, other keys may be placed along the side of the handheld electronic communication device 300 to function as escape keys, volume control keys, scrolling keys, power switches, or user programmable keys and may likewise be programmed accordingly.

As may be appreciated from FIG. 1, the handheld electronic communication device 300 comprises a lighted display screen 322 located above a keyboard 332 constituting a user input and suitable for accommodating textual input to the handheld electronic communication device 300. The front face of the body 370 of the handheld electronic communication device has a navigation row 70 and a key field 650 that includes alphanumeric input keys 630, alphabetic input keys 632, numeric input keys 42, and other function keys as shown in FIG. 1. As shown, the handheld electronic communication device 300 is of unibody construction, also known as a "candy-bar" design.

Keys, typically of a push-button or push-pad nature, perform well as data entry devices but present problems to the user when they must also be used to effect navigational control over a screen-cursor. In order to solve this problem, the present handheld electronic communication device 300 preferably includes an auxiliary input that acts as a cursor navigational tool and which is also exteriorly located upon the front face of the body 370 of the handheld electronic communication device 300. Its front face location is particularly advantageous because it makes the tool easily thumb-actuable like the keys of the keyboard. A particularly usable embodiment provides the navigational tool in the form of an optically based user input device 321, further details of which are provided below and in FIGS. 7 and 8, which is easily utilized to instruct two-dimensional screen cursor movement in substantially any direction, as well as act as an actuator when the optically based user input device 321 is depressed like a button. The placement of the optically based user input device navigation tool 327 is preferably above the keyboard 332 and below the display screen 322; here, it avoids interference during keyboarding and does not block the user's view of the display screen 322 during use. (See FIG. 1).

As illustrated in FIGS. 1 and 2, the present disclosure is directed to a handheld electronic communication device 300 configured to send and receive text messages. The handheld electronic communication device 300 includes a hand cradleable body configured to be held in one hand by an operator of the device during text entry. A display screen 322 is included that is located on a front face of the body 370 and upon which information is displayed to the operator during text entry. A key field 650 is also located on the front face of the body 370 of the elongate body and comprises a plurality of keys including a plurality of alphanumeric keys, symbol keys, and function keys. A navigation row 70 including menu keys 652 and an optically based user input device 321 is also located on the front face of the body 370. The alphanumeric input keys 630 comprise a plurality of alphabetic and numeric input keys 632, 42 having letters and numbers associated therewith. The order of the letters of the alphabetic input keys 632 on the presently disclosed handheld electronic communication device can be described as being of a traditional, but non-ITU Standard E.161 layout. This terminology has been utilized to delineate the fact that such a telephone keypad as depicted in FIG. 6 may not allow for efficient text entry on the handheld electronic communication device 300.

The handheld electronic communication device 300 is also configured to send and receive voice communications such as mobile telephone calls. To facilitate telephone calls, two call keys 605, 609 ("outer keys") are provided in the upper, navigation row 70 (so-called because it includes the optically based user input device navigation tool 327) at the outer ends of the navigation row 70. One of the two call keys is a call initiation key 605, and the other is a call termination key 609. The navigation row 70 also includes another pair of keys ("flanking keys") that are located immediately adjacent to the optically based user input device navigation tool 327, with one flanking key on either side of the optically based user input device navigation tool 327. It is noted that the outer keys are referred to as such not because they are necessarily the outermost keys in the navigation row—there may be additional keys located even further outwardly of the outer keys if desired—but rather because they are located outwardly with respect to the flanking keys. The flanking keys may, for instance, constitute the menu keys 652, which include a menu call-up key 606 and an escape or back key 608. The menu call-up key 606 is used to bring up a menu on the display screen 322 and the escape key 608 is used to return to the previous screen or previous menu selection. The functions of the call keys and the menu keys may, of course, be provided by buttons that are located elsewhere on the device, with different functions assigned to the outer keys and the flanking keys.

Furthermore, the device is equipped with components to enable operation of various programs, as shown in FIG. 2. In an exemplary embodiment, the flash memory 324 is enabled to provide a storage location for the operating system 357, application programs 358, and data. The operating system 357 is generally configured to manage other application programs 358 that are also stored in flash memory 324 and executable on the microprocessor 338. The operating system 357 honors requests for services made by application programs 358 through predefined application program 358 interfaces. More specifically, the operating system 357 typically determines the order in which multiple application programs 358 are executed on the microprocessor 338 and the execution time allotted for each application program 358, manages the sharing of flash memory 324 among multiple application programs 358, handles input and output to and from other device subsystems 342, and so on. In addition, users can typically interact directly with the operating system 357 through a user interface usually including the keyboard 332 and display screen 322. While in an exemplary embodiment the operating system 357 is stored in flash memory 324, the operating system 357 in other embodiments is stored in read-only memory (ROM) or similar storage element (not shown). As those skilled in the art will appreciate, the operating system 357, device application program 358 or parts thereof may be loaded in RAM 326 or other volatile memory.

In one exemplary embodiment, the flash memory 324 contains application programs 358 for execution on the handheld electronic communication device 300 including an address book 352, a personal information manager (PIM) 354, and the device state 350. Furthermore, application programs 358 and other information 356 including data can be segregated upon storage in the flash memory 324 of the handheld electronic communication device 300.

When the handheld electronic communication device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UTMS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the handheld electronic communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different handheld electronic communication devices 300. The handheld electronic communication device 300 may be able to operate some features without a SIM/RUIM card, but it will not be able to communicate with the network 319. A SIM/RUIM interface 344 located within the handheld electronic communication device 300 allows for removal or insertion of a SIM/RUIM card (not shown). The SIM/RUIM card features memory and holds key configurations 351, and other information 353 such as identification and subscriber related information. With a properly enabled handheld electronic communication device 300, two-way communication between the handheld electronic communication device 300 and communication network 319 is possible.

If the handheld electronic communication device 300 is enabled as described above or the communication network 319 does not require such enablement, the two-way communication enabled handheld electronic communication device 300 is able to both transmit and receive information from the communication network 319. The transfer of communication can be from the handheld electronic communication device 300 or to the handheld electronic communication device 300. In order to communicate with the communication network 319, the handheld electronic communication device 300 in the presently described exemplary embodiment is equipped with an integral or internal antenna 318 for transmitting signals to the communication network 319. Likewise the handheld electronic communication device 300 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the handheld electronic communication device 300.

When equipped for two-way communication, the handheld electronic communication device 300 features a communication subsystem 311. As is well known in the art, this communication subsystem 311 is modified so that it can support the operational needs of the handheld electronic communication device 300. The subsystem 311 includes a transmitter 314 and receiver 312 including the associated antenna or antennae (316, 318) as described above, local oscillators (LOs) 313, and a processing module 320 which in the presently described exemplary embodiment is a digital signal processor (DSP) 320.

It is contemplated that communication by the handheld electronic communication device 300 with the wireless network 319 can be any type of communication that both the wireless network 319 and handheld electronic communication device 300 are enabled to transmit, receive and process. In general, these can be classified as voice and data. Voice communication is communication in which signals for audible sounds are transmitted by the handheld electronic communication device 300 through the communication network 319. Data is all other types of communication that the handheld electronic communication device 300 is capable of performing within the constraints of the wireless network 319.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the handheld electronic communication device 300 is significantly enhanced (if not enabled) when connectable within a communication system, and particularly when connectable on a wireless basis in a network 319 in which voice, text messaging, and other data transfer are accommodated.

As intimated hereinabove, one of the more important aspects of the handheld electronic communication device 300 to which this disclosure is directed is its size. While some users will grasp the handheld electronic communication device 300 in both hands, it is intended that a predominance of users will cradle the handheld electronic communication device 300 in one hand in such a manner that input and control over the handheld electronic communication device 300 can be effected using the thumb of the same hand in which the handheld electronic communication device 300 is held. However, it is appreciated that additional control can be effected by using both hands. The size of the handheld electronic communication device 300 must be kept commensurately small, in order to have a handheld electronic communication device 300 that is easy to grasp and desirably pocketable. Of the device's dimensions, limiting its width is important for the purpose of assuring cradleability in a user's hand. Moreover, it is preferred that the width of the handheld electronic communication device 300 be maintained at less than eight centimeters (approximately three inches). Keeping the handheld electronic communication device 300 within these dimensional limits provides a hand cradleable unit that users prefer for its usability and portability. Limitations with respect to the height (length) of the handheld electronic communication device 300 are less stringent when considering hand-cradleability. Therefore, in order to gain greater size, the handheld electronic communication device 300 can be advantageously elongated so that its height is greater than its width, but still remains easily supported and operated in one hand.

A potential drawback is presented by the small size of the handheld electronic communication device 300 in that there is limited exterior surface area for the inclusion of user input and device output features. This is especially true for the "prime real estate" on the front face of the body 370 of the handheld electronic communication device 300, where it is most advantageous to include a display screen 322 that outputs information to the user. The display screen 322 is preferably located above a keyboard 332 that is utilized for data entry into the handheld electronic communication device 300 by the user. If the display screen 322 is provided below the keyboard 332, a problem occurs in that viewing the display screen 322 is inhibited when the user is inputting data using the keyboard 332. Therefore it is preferred that the display screen 322 be above the input area, thereby solving the problem by assuring that the hands and fingers do not block the view of the display screen 322 during data entry periods.

To facilitate textual data entry into the handheld electronic communication device 300, a keyboard 332 is provided. In the exemplary illustrated embodiment, a full alphabetic keyboard 332 is utilized in which there is one key per letter (with some of the letter keys also having numbers, symbols, or functions associated with them). In this regard, the associated letters can be advantageously organized in QWERTY, QWERTZ, AZERTY, or Dvorak layouts, among others, thereby capitalizing on certain users' familiarity with these various letter orders. In order to stay within the bounds of the limited front surface area, however, each of the keys must be commensurately small when, for example, twenty-six keys must be provided in the instance of the English language.

As shown in FIG. 1, the handheld electronic communication device 300 is cradleable in the palm of a user's hand. The handheld electronic communication device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably are arranged in the navigation row 70 including the optically based user input device navigation tool 327. Additionally, the navigation row 70 preferably has a menu call-up key 606 and a back key or escape key 608.

The keyboard 332 includes a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application program 358 or feature in use, specific keys can be enabled or disabled.

In the case of physical keys, all or a portion of the plurality of keys have one or more indicia representing character(s), command(s), functions(s), or a combination including one or more of character(s), command(s), and function(s) displayed at on one or more of their top surface and on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the display screen 322.

In the case of virtual keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld electronic communication device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

The various characters, commands, and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 3a. The QWERTZ keyboard layout is normally used in German-speaking regions; this alphabetic key arrangement 44b is shown in FIG. 3b. The AZERTY keyboard layout 44c is normally used in French-speaking regions and is shown in FIG. 3c. The Dvorak keyboard layout was designed to allow typists to type faster; this alphabetic key arrangement 44d is shown in FIG. 3d. In other exemplary embodiments, keyboards having multi-language key arrangements can be implemented.

Alphabetic key arrangements are often presented along with numeric key arrangements. Typically, the numbers 1-9 and 0 are positioned in the row above the alphabetic keys 44a-d, as shown in FIG. 3a-d. Alternatively, the numbers share keys with the alphabetic characters, such as the top row of the QWERTY keyboard. Yet another exemplary numeric key arrangement is shown in FIG. 4, where a "ten-key" style numeric keypad 46 is provided on a separate set of keys that is spaced from the alphabetic/numeric key arrangement 44. Still further, ten-key numeric arrangements may be common with or shared with a subset of the alphabetic keys. A ten-key styled numeric keypad includes the numbers "7", "8", "9" arranged in a top row; "4", "5", "6" arranged in a second row; "1", "2", "3" arranged in a third row; and "0" in a bottom row.

Further, a numeric phone key arrangement 42 is exemplarily illustrated in FIG. 5. As shown in FIG. 5, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality, with one letter per alphabetic key.

FIGS. 5 and 6 both feature numeric keys arranged according to the ITU Standard E.161 form. In addition, FIG. 6 also incorporates alphabetic characters according to the ITU Standard E.161 layout as well. The International Telecommunications Union ("ITU") has established phone standards for the arrangement of alphanumeric keys. The standard phone numeric key arrangement shown in FIGS. 5 (no alphabetic letters) and 6 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. As shown in FIG. 4, the numeric key arrangement can be overlaid on a QWERTY arrangement. The numeric arrangement as shown can be aptly described as a top-to-bottom ascending order three-by-three-over-zero pattern.

While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and more quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

As noted above, a navigation tool according to this disclosure suitably features an optically based user input device 321. In general, in one embodiment, the input member features a light-transmissive (transparent or translucent) fixed domed lens and a light source to illuminate a user's finger and a sensor to capture the finger's instructive movement as the user slides his finger over the fixed domed lens in a manner similar to using a conventional trackball (in which rotation of a ball causes roller sensors to rotate). While the description as provided herein refers to a user's finger, the description equally applies to other way in which a user could actuate the domed member including through the use of a thumb or other digit. In another embodiment, the optically based user input device 321 features a light-transmissive ball that the user actually rotates in a manner somewhat more similar to using a conventional trackball, but the optically based user input device 321 still features optically based sensing devices to measure rotation of the ball. In other words, in both embodiments, optical rather than mechanical means are used to measure movement of the user's finger and translate that movement into a navigational command to the handheld electronic communication device 300. The optically based device can be implemented using various forms of light including but not limited to visible light, infrared light, laser, and the like. The optically based user input device 321 is further configured such that an entry command (for example, selection of a graphical user interface icon, a highlighted menu item, and the like) is entered by depressing the optically based user input device 321.

More particularly, one embodiment of an optically based user input device 321 is illustrated in FIG. 7. As illustrated, the optically based user input device 321 includes a light-transmissive (for example, transparent or translucent) domed member 202 that is supported on a support member 204 and that is situated so as to protrude slightly above the housing (not shown) of the handheld electronic communication device 300. The light-transmissive domed member 202, which is sized on the order of magnitude of a user's fingertip, is suitably formed from plastic or glass and can have a hollow interior region 206. An optical image sensor 208, for example, a charge-coupled device (CCD), is housed within the light-transmissive domed member 202 and is suitably also supported on the support member 204. In general, the optical image sensor 208 registers the image of the region of contact 210 of the user's finger against the light-transmissive domed member 202; by comparing that image with previous images, software within the handheld electronic communication device 300 is able to determine the direction and amount of movement of the user's finger over the surface of the light-transmissive domed member 202.

In addition to the optical image sensor 208, the optically based user input device 321 may also include within the light-transmissive domed member 202 one or more image focusing elements (for example, lenses) 212 to help focus the image of the region of contact 210 onto the optical image sensor 208. Furthermore, in preferred embodiments, the outer surface of the light-transmissive domed member 202 is textured, as partially illustrated at regions 214, to enhance tactile feedback to the user as the user slides his or her finger over the surface of the light-transmissive domed member 202.

Still further, to enhance image-acquisition by the image sensor 208, a light source may be provided to illuminate the user's finger. For example, a light-guide may be provided by means of a light-transmissive ring 216 that surrounds the light-transmissive domed member 202 and that is supported by the housing of the handheld device (not shown). The light-transmissive ring 216 has one or more light sources 218 (for example, light-emitting diodes (LEDs)) embedded therein, which light sources 218 are able to illuminate the user's fingertip. Suitably, the upper surface 220 of the light-transmissive ring is inclined inwardly as shown to help the user maintain contact with the light-transmissive domed member 202 as he or she moves his/her finger over the surface of the light-transmissive domed member 202. In alternative embodiments, the light source may be provided by means of the main LCD screen of the device or by means of any keypad lighting device, with a suitable mechanism (for example, a light guide) to shine light from at least one of the LCD and keyboard 332 onto the user's fingertip. Alternatively, the multiple light sources maybe used in combination for providing illumination of the domed member 202. Furthermore, the light source 218 can be variously controlled and oriented to shine light through the light-transmissive domed member 202 in dependence upon an executing feature function of the handheld electronic communication device 300. The executing feature functions can include a ringtone, a music file playing on the device 300, a currently running program, a game, or other similar program or feature that could be paired with the illumination of the domed member 202. The light source may use more than one form of light to allow for continuous sensing of movement while the feature function is executed that illuminates light-transmissive domed member 202.

In addition to being used to control the motion of a cursor, screen highlighting, icon, graphical user interface (GUI), and the like, the optically based user input device 321 is used to enter a command, selection or the like into the device 300. To that end, in the embodiment illustrated in FIG. 7, the optically based user input device 321 is positioned over a switch arrangement 230, for example, a domed switch mounted on the printed circuit board 232 of the handheld electronic communication device 300. An actuation pin 234 extends downwardly from the support member 204 and is positioned over the switch arrangement 230. The user input device 321 is biased away from the switch arrangement 230 by virtue of a depressible suspension 235 comprising a support member 204, a biasing member 236, for example, a spring surrounding an actuation pin 234, a switch assembly 230 and a circuit board 232. While a spring surrounding an actuation pin 234 is illustrated, a dome switch can be implemented instead. The dome switch can be constructed such that it resiliently returns the user input device 321 to the unactuated position. Thus, the dome of the optically based user input device 321 may be depressed to make a selection or an entry into the handheld electronic communication device 300 by depressing the depressible suspension 235, thereby causing the biasing member 236 to urge the dome back to its original position when the user reduces or releases finger pressure on the light-transmissive domed member 202.

A second embodiment of an optically based user input device 321 is illustrated in FIG. 8. This embodiment includes a light-transmissive ball 240 that is free to rotate in all directions, and an optical image sensor 242. The ball, which is sized on the order of magnitude of a user's fingertip, is rotationally supported by a cup-shaped receiver 244, which may be a lens, which focuses the image of the region of contact of the user's finger against the light-transmissive ball 240 onto the optical image sensor 242. As in the previously disclosed embodiment, the optical image sensor 242 registers the image of the region of contact of the user's finger against the light-transmissive ball 240; by comparing that image with previous images, software within the handheld electronic communication device 300 is able to determine the direction and amount of movement of the light-transmissive ball 240 as the user rotates it.

As illustrated, the optical image sensor 242 is suitably mounted on a support member 246, and the cup-shaped receiver 244 is supported above the optical image sensor 242, for example, by stand-offs 248. This arrangement supports the light-transmissive ball 240 from below and allows it to rotate. Conversely, the light-transmissive ball 240 is retained from above by means of a frame member 250, which may be attached to the housing (not shown) of the handheld electronic communication device 300. As further illustrated, the assembly is positioned over a switch arrangement 252, for example, a domed switch on the printed circuit board 254 of the handheld electronic communication device 300, and an actuation pin 256 extends downwardly from the support member 246 and is positioned over the switch arrangement 252. The optically based user input device 321 is biased away from the switch arrangement 252 by virtue of a depressible suspension 253 comprising a support member 246, a biasing member 258, for example, a spring surrounding an actuation pin 256, a switch assembly 252 and a circuit board 254. Thus, the light-transmissive ball 240 of the optically based user input device 321 may be depressed to make a selection or an entry into the handheld electronic communication device 300 by depressing the depressible suspension 253, thereby causing the biasing member 258 to urge the light-transmissive ball 240 back to its original position when the user reduces or releases finger pressure on the light-transmissive ball 240.

Still further, as in the previously described embodiment, to enhance image-acquisition by the image sensor 242, a light source may be provided to illuminate the user's finger. For example, a light-guide may be provided by means of a light-transmissive ring 260 that is attached to the frame 250 and that surrounds the light-transmissive ball 240. The light-transmissive ring 260 has one or more light sources 262 (for example LEDs) embedded therein, which light sources 262 are able to illuminate the user's fingertip. Suitably, the upper surface 264 of the light-transmissive ring is inclined inwardly as shown to help the user maintain contact with the light-transmissive ball 240 as he or she moves it. In alternative embodiments, the light source may be provided by means of at least one of the main LCD screen of the device and by means of any keypad lighting device, with a suitable mechanism (for example, a light guide) to shine light from at least one of the LCD and keypad onto the user's fingertip.

Figure 9:
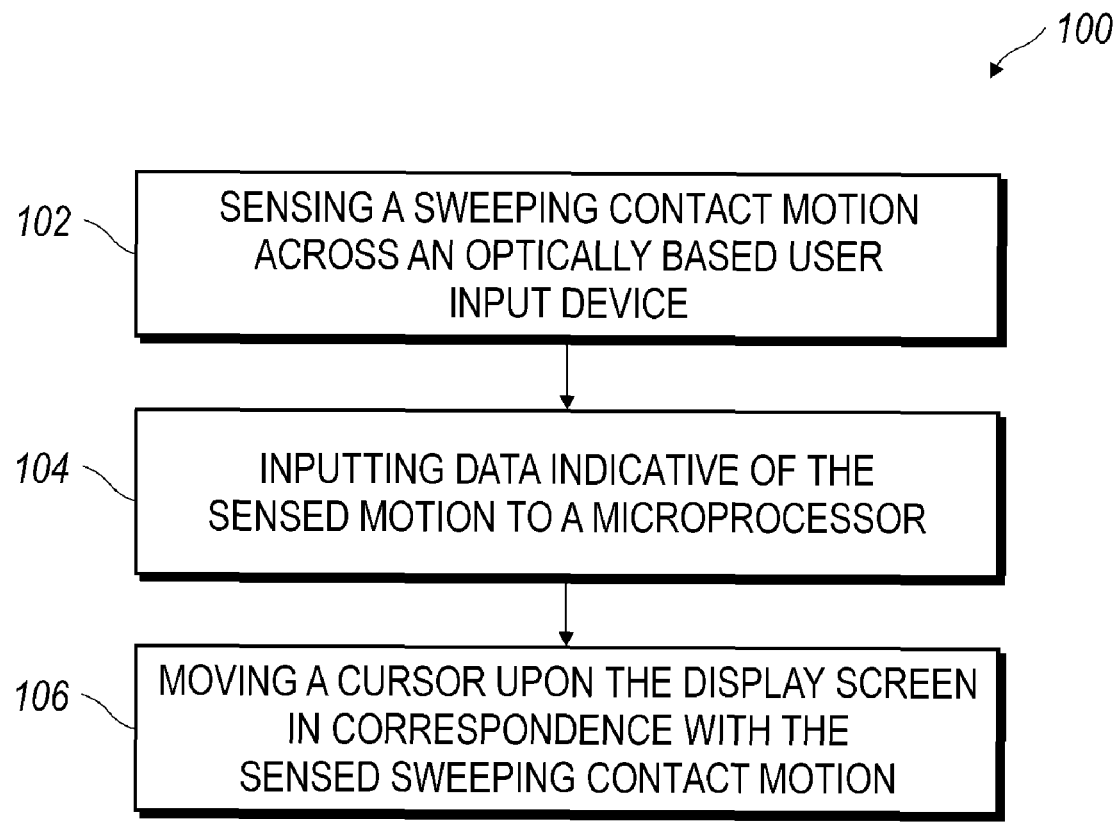
FIG. 9 is a flow chart illustrating an exemplary method for executing cursor navigation on a display screen of a handheld electronic communication device.

In yet another embodiment as illustrated in FIG. 9, a method for executing cursor navigation on a display screen 322 of a handheld electronic communication device 300 is presented. The method senses a sweeping contact motion across an optically based user input device on the front face of the body of the handheld electronic communication device (block 102). The front face of the body can be configured as described above and can include a display screen 322 located above the optically based user input device 321. The optically based user input device 321 comprises a light-transmissive domed member 202 having an exposed upper surface at the front face of the body 370 and an image sensor 208, 242 positions below the upper surface of the light-transmissive domed member within the body of the handheld electronic communication device 300. The method further includes inputting data indicative of the sensed motion to a microprocessor 338 communicatively interposed between the image sensor 208, 242 and the display screen 322 (block 104). The microprocessor 338 can be programmed as described above and can include programming to receive cursor guidance instructions via the image sensor and to cause corresponding cursor movement on the display screen 322. Additionally, the method moves a cursor upon the display screen 322 in correspondence with the sensed sweeping contact motion across the optically based user input device 321 (block 106). In at least one embodiment, the method further comprises variously controlling a light source disposed adjacent the light-transmissive domed member 202 and oriented to shine light therethrough toward the exposed upper surface in dependence upon an executing feature function of the handheld electronic communication device 300. Furthermore, the method can alternatively include elements described above in relation to the control of cursor navigation on the display screen of the handheld electronic communication device 300.

In yet another embodiment, a computer program for executing cursor navigation on the handheld electronic communication device 300 is presented. The computer program is configured to run on a microprocessor 338 in the handheld electronic communication device 300 and to receive data indicative of a sensed sweeping contact motion across an optically based user input device 321 on the front face of the body 370 of the handheld electronic communication device 300. The front face of the body 370 can be configured as described above and can include a display screen 322 located above the optically based user input device 321. Additionally, the optically based user input device 321 can be configured as described above and include a light-transmissive domed member 202 having an exposed upper surface at the front face of the body 370 and an image sensor 208, 242 positioned below the upper surface of the light-transmissive domed 202 member within the body of the device. The microprocessor 338 can be communicatively interposed between the image sensor 208, 242 and the display screen 322. Furthermore, the microprocessor 338 being further programmed to cause cursor movement on the display screen 322 in correspondence with the sensed sweeping contact motion across the cursor navigation area. In at least one embodiment, the computer program can be further configured to variously control a light source disposed adjacent the light-transmissive domed member 202 and oriented to shine light therethrough toward the exposed upper surface in dependence upon an executing feature function of the handheld electronic communication device 300.

Exemplary embodiments have been described hereinabove regarding both handheld electronic communication devices 300 as well as the communication networks 319 within which they operate. Again, it should be appreciated that the focus of the present disclosure is providing an optically based user input device for a handheld electronic communication device. Various modifications to and departures from the disclosed embodiments will occur to those having skill in the art. The subject matter that is intended to be within the spirit of this disclosure is set forth in the following claims.

What is claimed is:

1. A handheld electronic communication device, comprising:
    a body;
    a display screen provided at the body;
    an optically based user input device provided at the body, said optically based user input device comprising:
        a light-transmissive domed member having an upper surface that receives contact from an external object; and
        an image sensor positioned in optical communication with the upper surface of the light-transmissive dome member;
    a microprocessor communicatively coupled to the image sensor and the display screen and configured to receive image signals from the image sensor and to generate signals for navigating a cursor on the display screen; and
    a light source provided on the body and positioned proximate to the optically based user input device, the light source being oriented to emit light into a region external to the optically based user input device, the emitted light directly illuminating the external object and a portion of the emitted light reflecting from the external object onto the upper surface of the light-transmissive domed member, the reflected emitted light being guided to the image sensor.

2. The handheld electronic communication device as recited in claim 1, wherein the optically based user input device further comprises an image focusing element disposed between the upper surface of the light-transmissive domed member and the image sensor.

3. The handheld electronic communication device as recited in claim 1, wherein the upper surface of the light-transmissive domed member has a tactilely perceptible surface texturing.

4. The handheld electronic communication device as recited in claim 1, wherein the light source includes a ring-shaped body and at least partially surrounds the light-transmissive domed member.

5. The handheld electronic communication device as recited in claim 1, wherein the light source receives light emitted from a display lighting source.

6. The handheld electronic communication device as recited in claim 1, wherein the light source receives light emitted from a keyboard lighting source.

7. The handheld electronic communication device as recited in claim 1, wherein the optically based user input device is mounted upon a depressible suspension.

8. The handheld electronic communication device as recited in claim 7, further comprising a switch arrangement located below the depressible suspension, said switch arrangement being configured to be actuated upon depression of the optically based user input device.

9. The handheld electronic communication device as recited in claim 7, wherein the light-transmissive domed member is fixed relative the depressible suspension.

10. The handheld electronic communication device as recited in claim 7, wherein the light-transmissive domed member is rotatable relative to the depressible suspension.

11. The handheld electronic communication device as recited in claim 10, wherein the optically based user input device further comprises a cup-shaped receiver that retains the light-transmissive domed member and enables the light-transmissive domed member to rotate relative the cup-shaped receiver.

12. The handheld electronic communication device as recited in claim 1, further comprising a keyfield including a plurality of alphabetic input keys.

13. The handheld electronic communication device as recited in claim 12, wherein at least one of the plurality of alphabetic input keys is a physically depressible key.

14. The handheld electronic communication device as recited in claim 12, wherein at least one of the plurality of alphabetic input keys has a plurality of letter indicia associated therewith.

15. The handheld electronic communication device as recited in claim 14, wherein the letter indicia associated with the alphabetic input keys are arranged in a QWERTY order.

16. The handheld electronic communication device as recited in claim 1, wherein said display screen is located above the optically based user input device on a front face of the body.

17. A method for executing cursor navigation on a display screen of a handheld electronic communication device having a body that includes the display screen, an optically based user input device and a light source, the light source being provided on the body and positioned proximate to the optically based user input device, the method comprising:
    emitting light from the light source into a region external to the optically based user input device:
    receiving the emitted light reflected by an external object onto the optically based user input device;
    guiding the reflected emitted light into the optically based user input device;
    generating image signals from the guided reflected emitted light;
    generating navigation signals from the generated image signals; and
    converting the navigation signals into a cursor movement signals that affect movement of a cursor upon the display screen.

18. The method of claim 17, further comprising controlling the light emission in response to an executing feature function of the handheld electronic communication device.

19. A non-transitory computer readable medium storing computer executable instructions for performing navigation on a display screen of a handheld electronic communication device having a body that includes the display screen, an optically based user input device and a light source, the light source provided on the body and positioned proximate to the optically based user input device, the optically based user input device receiving contact from an external object, capturing light reflected from the external object into the optically based user input device and generating image signals from the captured light, the computer executable instructions, upon execution by a processor, cause the processor to:

emit light from the light source into a region external to the optically based user input device, a portion of the emitted light being reflected by the external object into the optically based user input device for generating the image signals;

generate navigation signals from the generated image signals; and convert the navigation signals into image moving signals that affect movement of an image upon the display screen.

20. The non-transitory computer readable medium of claim 19, wherein the computer executable instructions for execution by the processor are further executable to control the light emission in response to an executing feature function of the handheld electronic communication device.

21. The handheld electronic communication device as recited in claim 1, wherein the light source is disposed adjacent to the light-transmissive domed member.

* * * * *